United States Patent [19]

Chang

[11] 4,343,927
[45] * Aug. 10, 1982

[54] HYDROPHILIC, SOFT AND OXYGEN PERMEABLE COPOLYMER COMPOSITIONS

[76] Inventor: Sing-Hsiung Chang, 6, Buckskin Heights Dr., Danbury, Conn. 06810

[*] Notice: The portion of the term of this patent subsequent to Jan. 8, 1997, has been disclaimed.

[21] Appl. No.: 925,640

[22] Filed: Jul. 17, 1978

Related U.S. Application Data

[63] Continuation-in-part of Ser. No. 740,128, Nov. 8, 1976, Pat. No. 4,182,822.

[51] Int. Cl.$^3$ .................. C08F 20/10; C08F 26/06; C08F 30/08; C08F 220/26
[52] U.S. Cl. ............................ 526/262; 351/160 H; 264/1.1; 526/218; 526/227; 526/264; 526/265; 526/279
[58] Field of Search ............... 526/262, 264, 265, 279, 526/303

[56] References Cited

U.S. PATENT DOCUMENTS

| | | | |
|---|---|---|---|
| 3,808,178 | 4/1974 | Gaylord | 526/279 |
| 3,948,871 | 4/1976 | Butterfield et al. | 526/240 |
| 4,139,513 | 2/1979 | Tanaka et al. | 526/279 |
| 4,139,692 | 2/1979 | Tanaka et al. | 526/279 |

OTHER PUBLICATIONS

Derwent Abst. 617104/35, JS 2084258-T35, Toyo Contact Lens.

Primary Examiner—John C. Bleutge
Assistant Examiner—Herbert J. Lilling

[57] ABSTRACT

A new composition of matter specially adapted for the production of contact lenses, artificial eyes or other prosthetic devices. The composition has the characteristics of increased hydrophilicity, softness after hydration and oxygen permeability. The composition is a solid copolymer of comonomers consisting essentially of about 15 to about 65% by weight of one or more of the hydrophilic amide group containing monomers and about 10 to about 75% by weight of one or more of the polysiloxanylalkyl methacrylates or acrylates. Optionally, about 0.1 to about 65% by weight of at least one property modifier, a vinyl group containing monomer such as methyl methacrylate, can be employed into the copolymers. The inventive material is optionally transparent, translucent or opaque depending on the type, composition and relative content of the comonomers used. In general, the transparent composition is suitable for use in making contact lenses.

11 Claims, No Drawings

HYDROPHILIC, SOFT AND OXYGEN PERMEABLE COPOLYMER COMPOSITIONS

This is a continuation-in-part of Application No. 740-128 filed on Nov. 8, 1976 now U.S. Pat. No. 4,182,822. Now it is pending.

FIELD OF INVENTION

This invention relates to novel copolymer compositions, and more particularly to hydrophilic, soft after hydration and oxygen-permeable copolymers. The inventive copolymers can be fabricated to, and provide, improved contact lenses, artificial eye or other prosthetic devices.

DISCUSSION OF THE PRIOR ART AND BACKGROUND OF THE INVENTION

The basic requirements for polymeric materials in some areas of medical application are that they be hydrophilic, soft and oxygen-permeable. The prior art teaches the use of many different polymeric materials in these areas such as in contact lenses, intraocular lens and other prosthetic devices. Although these polymers possess certain desirable properties for their specific medical application, they suffer from other undesirable characteristics which reduce their utility.

In contact lens area, the hard lens material, polymethyl methacrylate (PMMA), is durable but relatively impermeable to oxygen and further suffers from being rigid and hydrophobic. The hydrogel contact lens based on hydrophilic polymers such as polyhydroxyethyl methacrylate (Poly HEMA) are soft but with poor durability and dimensional stability. It also does not have enough oxygen permeability.

Another polymeric material is silicone rubber, one kind of polysiloxane, which can also be used in contact lens and other prosthetic devices. Although it is soft, resilient and is highly gas permeable, it is hydrophobic.

As compared to the hard lens material, PMMA, the copolymers taught in the patent to Gaylord, U. S. Pat. No. 3,808,178, for contact lens fabrication have relatively high oxygen permeability, but suffer from being rigid and relatively hydrophobic.

Accordingly, it would be highly useful in a number of medical applications to provide a polymeric material having increased hydrophilicity, softness after hydration, and oxygen permeability. For contact lenses, this material provides a combination of properties that are close to an ideal combination of properties of the best features of the hard lens material, PMMA, soft lens material, Poly HEMA, silicone rubber and the Gaylord copolymer lenses. For other prosthetic devices, features such as increased hydrophilicity, softness after hydration and gas permeability are also very useful and desirable. The inventive composition has been found to provide above features.

SUMMARY OF THE INVENTION

The invention relates to a new composition of matter specially adapted for the making of contact lenses, artificial eyes or other prosthetic devices.

An object of the invention is to provide a new and useful composition for medical prosthetic devices. Another object of the invention is to provide increased hydrophilicity, softness after hydration and oxygen permeability for hard contact lens composition. Still another object of the invention is also to provide for increasing the oxygen permeability of soft lens compositions.

Yet another object of the invention is to provide increased hydrophilic, soft after hydration and oxygen-permeable compositions.

The novel copolymers which are disclosed are prepared by essentially copolymerizing the amide group containing monomers with Polysilotanylalkyl methacrylates or acrylates. Particularly effective for this invention is a copolymer composition of comonomers consisting essentially of:

(A) about 15 to about 65, preferably about 20 to about 55 and most preferably about 25 to about 45 weight percent of at least one of the hydrophilic amide group containing monomers;

(B) about 10 to about 75, preferably 20 to 55 and most preferably 25 to 45 weight percent of at least one of the Polysilotanylalkyl methacrylates or acrylates; and (C) optionally, about 0.1 to about 65% by weight of at least one ester of a $C_1$-$C_{20}$ alkanol and an acid selected from a group consisting of acrylic and methacrylic acids.

The typical amide group containing monomers that are suitable for the practice of this invention must be hydrophilic and must contain a carbonyl functionality adjacent to the nitrogen, which can be either in the heterocyclic ring or in the noncyclic structure. In addition, such monomers must contain a polymerizable olefin containing group (hereafter, G), which is preferably selected from a group consisting essentially of vinyl, acryloxy and methacryloxy groups ($CH_2=CR_1COO-$), acrylatoalkyl and methacrylatoalkyl groups ($CH_2=CR_1COO(CH_2)_m-$), acrylamido and methacrylamidoalkyl groups ($CH_2=CR_1CONH(CH_2)_m-$), wherein $R_1$ is either hydrogen or methyl group, m is an integer of from one to 4. Preferably G is bonded to the nitrogen atom of the amide group. The suitable heterocyclic amide containing group of the monomer is preferably selected from a group consisting essentially of pyrrolidone, piperidone, imidazolidone and succinimide. It is understood that these amide containing group may be substituted in the heterocyclic ring by one or more of low alkyl groups such as methyl, ethyl and the like. The suitable noncyclic amide group containing monomer is preferably selected from a group consisting essentially of N-alkyl acrylamide and methacrylamide and N,N-dialkyl acrylamide and methacrylamide, wherein each alkyl group is individually an unsubstituted monovalent hydrocarbon radical having one to 6 carbon atoms or a substituted monovalent hydrocarbon radical having from one to 6 carbon atoms wherein the substituent can be selected from a group consisting of amino, alkoxy, carbonyl and hydroxy groups. It is understood of course that mixtures of such heterocyclic and noncyclic monomers can be employed in preparing the copolymers of the present invention.

The preferred heterocyclic monomers employed are N-vinyl lactams of which N-vinyl-2-pyrrolidone is the most preferred, and the preferred noncyclic monomers employed are N,N-dialkyl methacrylamide of which N,N-dimethyl methacrylamide is the most preferred.

The Polysilotanylalkyl methacrylates or acrylates that are suitable for the practice of this invention fall within the general acrylated or methacrylated organosilicon compounds. The essential constituent units of each molecular compound have the formulas:

M, $CH_2=CRCOO(CH_2)_nR'_aSiO_{\frac{3-a}{2}}$ and

N, $R''_bSiO_{\frac{4-b}{2}}$ wherein the molar ratios of M to N are within selected the range of from about 1 to 99 to about 99 to 1, more particularly from about 1 to 50 to about 50 to 1 and most particularly from about 1 to 20 to about 20 to 1; R is selected from a group consisting of hydrogen and methyl group; R' and R", which may be the same or different, are monovalent hydrocarbon groups selected from a group consisting of $C_1$–$C_4$ alkyl groups, cyclohexyl groups and phenyl groups; n is an integer of from one to three inclusive: a is an integer selected a range of from 0 to 2 inclusive and b is an integer selected a range of from zero to three inclusive.

The term of "molar ratio" is not used herein as based upon the actual molecular weight of the copolymer per se, but rather as based upon the molecular weight of the unit or average molecular weight of the units which are present in such copolymer, as is the common practice in the polymer chemistry.

The defined copolymeric siloxane can contain either one or two of such monovalent hydrocarbon radicals attached to any given silicon atom. The R' and R" groups attached to the individual silicon atoms can be the same or different radicals. The copolymeric organosiloxanes prepared can themselves contain the $SiO_2$, $R''SiO_{1.5}$, $R''_2SiO$, or $R''_3SiO_{0.5}$ siloxane units and with any desired variation of R" radicals attached to silicon atoms, as long as they are liquid so that intimate contact can be made with the amide group containing monomers and other monomers. Preferably, R' and R" are methyl groups.

The general procedures to synthesize the above defined copolymeric organosiloxane which is suitable for the practice of this invention are well known in the art of silicone chemistry. One of the preferred methods is to react the corresponding chloromethyl substituted organosilicon compounds with a triethylamine salt of either acrylic or methacrylic acid as illustrated in Example 19 of this specification. As is well known in the art, the chloromethyl substituted organosilicon compounds employed as intermediates in the above preparations may themselves be prepared by halogenating a methyl trihalosilane and subjecting the product to reaction with a Grignard reagent to replace some or all of the silicon bonded halogen atoms, followed if desired by the hydrolysis of the unreacted silicon bonded halogen atoms to produce the corresponding siloxane.

Alternatively, the defined copolymeric organosiloxanes can be prepared by means of the well known acid catalyzed siloxane condensation methods. One of the preferred methods is to react γ-methacryloxypropyltrimethoxysilane with trimethylacetoxysilane or other corresponding acetoxysiloxanes as illustrated in Example 1 herein, and the other method is to mix the acrylated or methacrylated organ siloxane as defined previously in formula M with the organosiloxane as defined in formula N in the desired ratio and the mixture heated in the presence of an acid catalyst such as concentrated sulfuric acid. The acid catalyst is preferably present in an amount of from 0.5 to 3 percent by weight based upon the weight of the combined reactants. This reaction proceeds at room temperature, but is preferably speeded up by heating the mixture at a higher temperature. Obviously, in order to prepare a mono- or multifunctional, i.e., mono- or multi-acrylated or methacrylated copolymeric organosiloxane which is suitable for the practice of this invention, the above mentioned methods can be properly combined to use, such as those described in the U.S. Pat. No. 2,956,044.

Optionally, the physical properties of the copolymers in this invention can be modified by copolymerizing the composition mixture with one or more of vinyl group containing monomers. For example, if desired, in order to increase the strength, hardness, or in some cases to improve the optical properties or to act as additive of the copolymers, about 0.1 to about 65, preferably 5 to 50 and most preferably 15 to 35% by weight of one or more of the vinyl group containing monomers or an ester of a $C_1$–$C_{20}$ alkanol and an acid selected from a class consisting of acrylic and methacrylic acids, such as methyl methacrylate, ethyl acrylate and methacrylate, butyl acrylate and methacrylate, amyl acrylate and methacrylate, hexyl acrylate and methacrylate, octyl acrylate and methacrylate, 2-ethylhexyl acrylate and methacrylate, decyl acrylate and methacrylate, lauryl acrylate and methacrylate, octadecyl acrylate and methacrylate, and the like, can be incorporated into the materials by the technique of copolymerization. In some cases, when silicone monomer can not freely be miscible with amide group containing monomers, this type of property modifier can also be used as compatible agent, such as MMA is used in Example 9 of this specification.

The rigidity of the copolymer in this invention can also be improved, if desired, by incorporating into the material with about 0.1 to about 20, preferably about 0.1 to about 5% by weight of one or more of the vinyl group containing crosslinking monomers. Representative of crosslinking monomers which are suitable for the practice of this invention are polyol dimethacrylate or diacrylate or a polyol acrylic or methacrylic ester of higher functionality, for example, mono, di, tri, or tetraethylene glycol dimethacrylate, butylene glycol dimethacrylate, neopentyl diacrylate and pentaerythritol triacrylate or tetracrylate and the like.

The copolymers of the invention are prepared by contacting the mixture of comonomers with a free radical generating polymerization initiator of the type commonly used in polymerizing ethylenically unsaturated compounds. Representative free radical polymerization initiators are organic peroxides, such as acetyl peroxide, lauroyl peroxide, decanoyl peroxide, stearoyl peroxide, benzoyl peroxide, tertiarybutyl peroxypivalate, acetyl peroxy isobutyl carbonate and the like. Other catalysts, such as α,α-azobisisobutyronitrile, can also be used. Alternatively, in certain cases the mixture of the comonomers can also be polymerized by radiation initiated polymerization. Conventional polymerization techniques can be employed to produce the novel copolymers. The comonomer mixture containing the free radical initiator, generally from about 0.01 to about 5 and preferably between 0.05 to 2 percent by weight, is heated to a temperature of from about 45° C. to 100° C. or even higher but preferably between 45° C. to 70° C., to initiate and complete the polymerization.

The polymerization can be carried out directly in a mold with the desired configuration such as for contact lenses. Alternatively, the polymerization mixture can be heated in a suitable mold or container to form discs, rods, sheets or other forms which can then be fabricated into the desired shape using conventional equipment and technology well known in the art. Instead of employing the bulk polymerization techniques described above, one can employ solution, emulsion or suspension polymerization to prepare the novel copolymers, using techniques conventionally used in the preparation of polymers from ethylenically unsaturated monomers. The copolymer thus produced may be extruded, pressed or molded into rods, sheets or other convenient shapes which are then machined to produce a contact lens or other prosthetic devices. The inventive copolymers can also be tinted as known in the art.

The inventive copolymer is optionally transparent, translucent or opaque depending on the type, composition and relative content of the comonomers used. Generally speaking, the transparent product is suitable for contact lens fabrication.

The novel copolymers have vastly increased hydrophilicity in comparison to the corresponding copolymers taught in U.S. Pat. No. 3,808,178, the conventional hard lens material, polymethyl methacrylate (PMMA), or silicone rubber used in medical applications. For example, a copolymer comprising 45% by volume of N-vinyl pyrrolidone, 25% by volume of copolymeric organosiloxane, $Si_1$ prepared in Example 1 of this specification and 30% by volume of methyl methacrylate (MMA) as taught in this invention can absorb water or hydrate up to about 26% of its weight, whereas the hard lens material, PMMA, and the copolymer with the composition of 25% of $Si_1$ and 75% of MMA as taught in the above mentioned patent can only be hydrated up to about 0.5% of the weight. If the wettability of the copolymer is improved by the addition of up to about 10% of hydrophilic HEMA in the comonomeric mixture as described in Examples 3–9 of the Gaylord patent, the hydration of the material prepared therefrom is also only about 1%. The silicone rubber is essentially hydrophobic.

In addition, the novel copolymers taught in this invention have vastly increased softness after hydration. For example, in the above mentioned examples before hydration the hardness of the material taught in this invention is at about 75 as measured by Portable Hardness Tester, Model GYZJ 936, Barber-Colman Co., Ill., but after fully hydrated, it becomes about 15; whereas the others still keep at about original value, PMMA at about 93 and the others at about 80. Generally the degree of softness of the copolymer after hydration in this invention depends on the degree of its hydrophilicity. The higher the content of the hydrophilic comonomer in the copolymer, the higher the degree of its hydrophilicity and the softer the lens is after hydration. In the practice of this invention it is preferred to select the copolymer with percent of hydration between about 8 to about 35%.

Furthermore, the novel copolymers have also vastly increased gas permeability in comparison to conventional contact lens materials, PMMA, and soft lens material, polyhydroxyethyl methacrylate (Poly HEMA). For example, a copolymer comprising 30 parts by volume of N-vinyl pyrrolidone, 50 parts of $Si_1$ and 20 parts of MMA has an oxygen permeability of about 1,600 c.c-mil/100 in$^2$/24 hrs/atm compared to an oxygen permeability of about 30 for PMMA and about 15 for Poly HEMA as described in the Gaylord patent. The oxygen permeability values of the Gaylord copolymers illustrated in the examples of the Gaylord patent are between 300 and 500 units only. These oxygen permeability values were determined in accordance with ASTM D1434. The substantially increased oxygen permeability of the compositions of this invention could be due to the synergistic effect of the components used.

In the practice of this invention in contact lens area, the refractive index is an important but noncritical characteristic. Thus, the refractive index of polymethyl methacrylate, the polymer most widely used in the fabrication of hard contact lenses, is 1.49. The refractive indices of the copolymers useful in the practice of this invention in the fabrication of contact lenses are preferably selected between about 1.4 and about 1.5 which may be varied by changing the ratio and nature of the comonomers used.

The following examples are presented to illustrate the practice of the invention and not as an indication of the limits of the scope thereof.

EXAMPLE 1

This example illustrates one of the general procedures to synthesize the first type of copolymeric organosiloxane that are suitable for the practice of this invention by the well known acid catalyzed siloxane condensation method.

23.8 g. (13 ml) of concentrated sulfuric acid is added slowly with stirring to a mixture of 11.6 g. (14.7 ml) of absolute ethanol and 16.5 ml of water. The mixture is cooled in a water bath.

α-methacryloxypropyltrimethoxysilane (0.1 mole, 24.8 g.) is mixed with 0.3 mole (39.6 g.) of trimethylacetoxysilane prepared from trimethylchlorosilane by following the procedure which is described in the article, Journal of American Chemical Society, 74, 4584 (1952), in a flask equipped with a magnetic stirrer. Ethylsulfuric acid (6.5 g.), prepared as described above, is added dropwise from a dropping funnel into the stirred mixture. The flask is cooled during the addition of the ethylsulfuric acid catalyst solution in an ice water bath. After completion of the catalyst addition, the solution is stirred at room temperature for two days. The upper oily layer is then separated, washed with water until neutral, decolorized with activated carbon if required and then dried over anhydrous sodium sulfate. The produce is distilled under high vacuum, provided by high vacuum pump, Vac Torr 25, Precision Scientific Co., to remove methyl acetate, dimer of silane, siloxane or other impurities. The distillation flask is immersed in a water bath whose temperature is maintained at about 50° C., to facilitate the distillation. The material thus obtained is refrigerated until use.

The procedure described above can also be used to synthesize other corresponding organosilicon compounds, if trimethyl acetoxysilane used in the reaction is replaced by the other desired acetoxy siloxane, such as pentamethyl acetoxydisiloxane, heptamethyl acetoxy trisiloxane and the like. Apparently, the higher the number of silicon in the acetoxysiloxane used, the higher the vacuum and the higher the temperature of water bath, such 80° or 90° C. or even higher should be used in order to distill out the impurities. When pentamethyl acetoxydisiloxane is used in the reaction, the copolymeric organosilicon compound thus prepared is called $Si_2$.

EXAMPLES 2–9

The examples illustrate the preparations and properties of the copolymers containing varying proportions of heterocyclic amide group containing monomer, e.g., N-vinyl-2-pyrrolidone (VP), the first type of organosilicon compounds, e.g., $Si_1$ and $Si_2$, with or without property modifier monomers, e.g., MMA, and further with or without crosslinking monomers, e.g., tetraethylene glycol dimethacrylate (TEGDM). Furthermore, they also illustrate that a prosthetic device can directly be made from copolymerizing the composition mixture in a mold with a desired configuration.

The mixture of VP, $Si_1$ or $Si_2$ with or without MMA, crosslinking agent, TEGDM, and with t-butyl peroxypivalate (t-BPP) about 0.004 ml per after flushing nitrogen through the reaction mixture for 30 minutes, was polymerized in a glass tube at 50° C. for about 48 hours, followed by placing at 100° C. oil bath for another 24 hrs. After the tube was broken, they were all in the forms of rods. The composition and properties of the copolymers are collected in the following table. As indicated, all the rods are either transparent or opaque, hard and rigid before hydration which can be cut, machined, polished and finished to contact lenses or other prosthetic devices by the techniques well known in the art.

| Example | COMPOSITION, VOL. PERCENT | | | | | Properties* |
|---|---|---|---|---|---|---|
| | VP | $Si_1$ | $Si_2$ | MMA | TEGDM | |
| 2 | 33 | 67 | | 0 | 0 | H, T, R |
| 3 | 50 | 50 | | 0 | 0 | H, Op., R |
| 4 | 45 | 25 | | 30 | 0 | H, T, R |
| 5 | 40 | 50 | | 10 | 0 | H, T, R |
| 6 | 30 | 50 | | 20 | 0 | H, T, R |
| 7 | 20 | 50 | | 30 | 0 | H, T, R |
| 8 | 30 | 50 | | 15 | 5 | H, T, R |
| 9 | 35 | | 35 | 30 | 0 | H, T, R |

*properties before hydration: H = hard; T = transparent; Op = opaque; R = rigid

EXAMPLES 10–16

The examples illustrate the hydrophilic properties of the novel copolymers.

A small piece of sample (about 0.1 cm width) was cut from the cylindrical rod prepared in the above examples, followed by immersing in water for about 18 hrs. The hydrophilicity is expressed as percent of hydration which can be calculated by the following formula:

$$\% \text{ Hydration} = \frac{\Delta W}{Wt} \times 100$$

wherein:

$\Delta W$ = weight difference of the sample after and before hydration.

$Wt$ = weight of the sample before hydration.

The approximate value of the percent hydration of the copolymer is collected in the table below:

| Example # | Sample #$^a$ | % Hydration |
|---|---|---|
| 10 | 2 | 7 |
| 11 | 4 | 26 |
| 12 | 5 | 14 |
| 13 | 6 | 8 |
| 14 | 7 | 3 |
| 15 | b | 0.5 |
| 16 | c | 1 |

$^a$The number indicates the Example number from which the sample was prepared.
$^b$The sample being prepared from the copolymer of 50% by weight of $Si_1$ and 50% of MMA as taught in the patent to Gaylord, U.S. Pat. No. 3,808,178.
$^c$The sample was prepared from the copolymer of 50% by weight of $Si_1$, 39% of MMA and 11% of HEMA. The HEMA was used to improve the wettability of the copolymer as taught in the Gaylord patent.

EXAMPLE 17

This example illustrates the increased softness of the copolymers after hydration in this invention.

The hardness of the copolymer prepared in Example 4 before hydration is about 72 as measured by the portable Hardness Tester, Model GYZJ 936, Barber-Colman Co., Ill., after hydration, it is about 15; whereas the hardness of hard lens material, PMMA, before hydration is about 90, after hydration it is still at about 90. The hardness of the copolymer containing the corresponding composition with that prepared in Example 4, i.e., 25% of $Si_1$ and 75% of MMA by volume as taught in U.S. Pat. No. 3,808,178, before hydration is about 80 after hydration it is still at about 80.

EXAMPLE 18

This example illustrates the gas permeability of the copolymers in this invention.

The oxygen permeability of the copolymer prepared in Example 6 is about 1,600 c.c-mil/100 in$^2$/24 hours/atm. in comparison to about 35 for hard lens material, PMMA, and about 15 for soft lens material, Poly HEMA, which are described in the Gaylord patent. The oxygen permeabilities of the copolymers illustrated in the Examples of the Gaylord patent are between 300 and 500 units only. These oxygen permeability values were determined in accordance with ASTM D1434.

EXAMPLE 19

This example illustrates another general procedure to synthesize the other type of the desired copolymeric organosiloxanes, e.g., pentamethyldisiloxanyl methyl methacrylate ($Si_3$), by the well known reaction of the corresponding chloromethyl substituted organosilicon compounds with a triethylamine salt of either acrylic or methacrylic acid.

The detailed procedure to synthesize the desired copolymeric organosiloxanes is described in Example 1 of the patent to Gaylord, U.S. Pat. No. 3,808,178.

EXAMPLE 20–26

These examples illustrate the preparations and properties of the copolymers containing different types of organosilicon compounds, e.g., $Si_1$ and $Si_2$, and different types of the amide group containing monomers with heterocyclic and noncyclic structures, e.g., VP, N,N-dimethyl methacrylamide (NNMA) and N,N-dimethylacrylamide (NNAA).

The cylindrical rods can be prepared in the manner described in Examples 2–9 from the comonomeric mixture as listed in the following table:

| Example # | COMPOSITION, VOL. PERCENT | | | | | |
|---|---|---|---|---|---|---|
| | NNMA | NNAA | VP | $Si_1$ | $Si_2$ | MMA |
| 20 | 30 | 30 | | 40 | | |
| 21 | 40 | | | 30 | 30 | |
| 22 | 30 | 20 | | | 50 | |
| 23 | 20 | | | | 50 | 30 |
| 24 | 30 | | | | 40 | 30 |
| 25 | 15 | | | 30 | 35 | 20 |
| 26 | | | 40 | | 35 | 25 |

The copolymers thus prepared can be used in the practice of this invention.

Obviously many other modifications and variations of the composition of this novel copolymer prepared therefrom, are possible in the light of the teachings given hereinabove, It is, therefore, to be understood that, within the scope of the appended claims, the invention can be practiced otherwise than as specifically described.

What is claimed is:

1. A composition of matter specially adapted for use as a prosthetic device having the characteristics of increased hydrophilicity, and oxygen permeability, said composition being a copolymer of comonomers consisting essentially of:
(A) about 15 to about 65% by weight of at least one amide group containing monomer being selected from a group consisting essentially of:
  (a) heterocyclic amide group containing monomers consisting essentially of:
    (1) N-(olefin containing group)-2-pyrrolidone,
    (2) N-(olefin containing group)-2-piperidone,
    (3) N-(olefin containing group)-2-imidazolidone, and
    (4) N-(olefin containing group) succinimide,
  wherein said olefin containing group is selected from a group consisting essentially of vinyl, acryloxy, methacryloxy, acrylatoalkyl, methacrylatoalkyl, acrylamidoalkyl and methacrylamidoalkyl groups, wherein the alkyl group contains from one to 4 carbon atoms, and
  (b) noncyclic amide group containing monomers consisting essentially of N-alkyl acrylamide, N-alkyl methacrylamide, N,N-dialkyl acrylamide and N,N-dialkyl methacrylamide, wherein the alkyl group is individually selected from a group consisting of unsubstituted and substituted monovalent hydrocarbon radicals having from one to 6 carbon atoms, and
(B) about 10 to about 75% by weight of at least one organosilicon compound, wherein the essential constituent units of each molecular compound have the formulas:

M,  and

N, 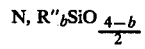

wherein each molecular compound contains one M group and the molar ratio of from about 1 to 99 to about 99 to 1; R is selected from a group consisting of hydrogen and methyl group; R' and R", which may be the same or different, are monovalent hydrocarbon groups selected from a group consisting of $C_1$–$C_4$ alkyl groups, cyclohexyl groups and phenyl groups; n is an integer of from one to three inclusive; a is an integer selected from a range of 0 to 2 inclusive and b is an integer selected from a range of zero to three inclusive.

2. The composition of claim 1, wherein said amide group containing monomer being selected from a group consisting essentially of N-vinyl-2-pyrrolidone, N-(2'-methacrylatoethyl)-2-pyrrolidone, N-vinyl-2-piperidone, N-(2'-methacrylatoethyl)-2-piperidone, N-alkyl acrylamide, N-alkyl methacrylamide, N,N-dialkyl acrylamide, N,N-dialkyl methacrylamide and mixture thereof.

3. The composition of claim 1, wherein there is about 20 to about 55% by weight of at least one amide group containing monomer and about 20 to about 55% by weight of at least one organosilicon compound.

4. The composition of claim 3, wherein said prosthetic device is a contact lens device.

5. The composition of claim 4, wherein there is about 25 to about 45% by weight of at least one amide group containing monomer.

6. The composition of claim 5, wherein said amide group containing monomer is N-vinyl-2-pyrrolidone.

7. The composition of claim 5, wherein said amide group containing monomer is N-(2'-methacrylatoethyl)-2-pyrrolidone.

8. The composition of claim 5, wherein said amide group containing monomer is N,N-dimethyl methacrylamide.

9. A composition of matter specially adapted for use as a prosthetic device having the characteristics of increased hydrophilicity, and oxygen permeability, said composition being a copolymer of comonomers consisting essentially of:
(A) about 15 to about 65% by weight of at least one amide group containing monomer being selected from a group consisting essentially of:
  (a) heterocyclic amide group containing monomers consisting essentially of:
    (1) N-(olefin containing group)-2-pyrrolidone,
    (2) N-(olefin containing group)-2-piperidone,
    (3) N-(olefin containing group)-2-imidazolidone, and
    (4) N-(olefin containing group) succinimide,
  wherein said olefin containing group is selected from a group consisting essentially of vinyl, acryloxy, methacryloxy, acrylatoalkyl, methacrylatoalkyl, acrylamidoalkyl and methacrylamidoalkyl groups, wherein the alkyl group contains from one to 4 carbon atoms, and
  (b) noncyclic amide group containing monomers consisting essentially of N-alkyl acrylamide, N-alkyl methacrylamide, N,N-dialkylacrylamide and N,N-dialkylmethacrylamide, wherein the alkyl group is individually selected from a group consisting of unsubstituted and substituted monovalent hydrocarbon radicals having from one to 6 carbon atoms;
(B) about 10 to about 75% by weight of at least one organosilicon compound, wherein the essential constituent units of each molecular compound have the formulas:

M,  and

N, 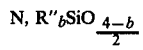

wherein each molecular compound contains one M group and the molar ratio of from about 1 to 99 to about 99 to 1; R is selected from a group consisting of hydrogen and methyl group; R' and R", which may be the same or different, are monovalent hydrocarbon groups selected from a group consisting of $C_1$–$C_4$ alkyl groups, cyclohexyl groups and phenyl groups; n is an integer of from one to three inclusive; a is an integer selected a range of from 0 to 2 inclusive and b is an integer selected a range of from zero to three inclusive; and
(C) about 0.1 to about 65% by weight of at least one ester of a $C_1$–$C_{20}$ alkanol and an acid selected from a group consisting of acrylic and methacrylic acids.

10. The composition of claim 9, wherein there is about 20 to about 55% by weight of at least one amide group containing monomer and about 20 to about 55% by weight of at least one organosilicon compound, the said amide group containing monomer is selected from a group consisting essentially of N-vinyl-2-pyrrolidone, N-(2'-methacrylatoethyl)-2-pyrrolidone, N-vinyl-2-piperidone, N-alkyl acrylamide, N-alkyl methacrylamide, N,N-dialkyl acrylamide, N,N-dialkyl methacrylamide and mixture thereof.

11. A composition of matter specially adapted for use as a contact lens device having the characteristics of increased hydrophilicity, and oxygen permeability, said composition being a copolymer of comonomers consisting essentially of:

(A) about 20 to about 45% by weight of at least one amide group containing monomer being selected from a group consisting essentially of N-vinyl-2-pyrrolidone, N-(2'-methacrylatoethyl)-2-pyrrolidone, N-methyl acrylamide, N-methyl methacrylamide, N,N-dimethyl acrylamide and N,N-dimethyl methacrylamide;

(B) about 10 to about 50% by weight of at least one organosilicon compound, wherein the essential constituent units of each molecular compound have the formulas:

M, $CH_2=CRCOO(CH_2)_n R'_a SiO_{\frac{3-a}{2}}$ and

N, $R''_b SiO_{\frac{4-b}{2}}$ wherein each molecular compound contains one M group and the molar ratio of about 1 to 99 to about 99 to 1; R is selected from a group consisting of hydrogen and methyl group; R' and R'', which may be the same or different, are monovalent hydrocarbon groups selected from a group consisting of $C_1$-$C_4$ alkyl groups and phenyl groups; n is an integer of from one to three inclusive; a is an integer selected a range of from 0 to 2 inclusive and b is an integer selected a range of from zero to three inclusive; and (C) 0.2 to about 35% by weight of at least one ester of a $C_1$-$C_{20}$ alkanol and an acid selected from a group consisting of acrylic and methacrylic acids.

* * * * *